May 26, 1953 R. L. DUNCAN 2,639,686
INDICATOR
Filed March 12, 1946
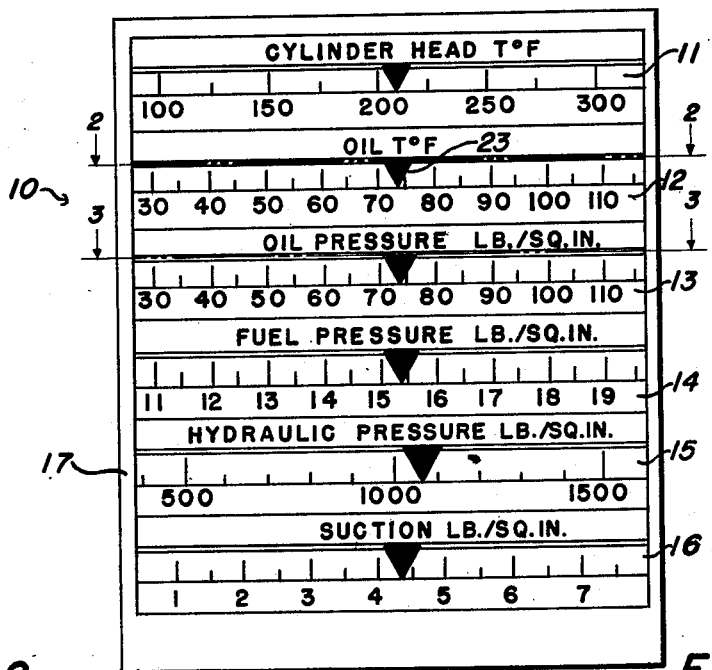
Fig.1
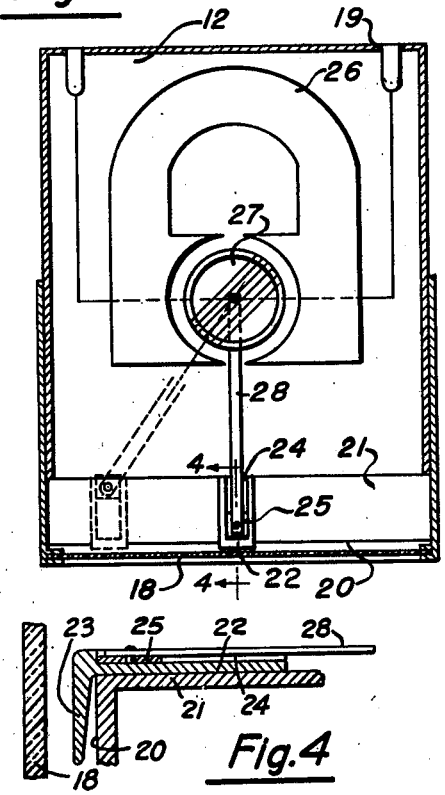
Fig.2
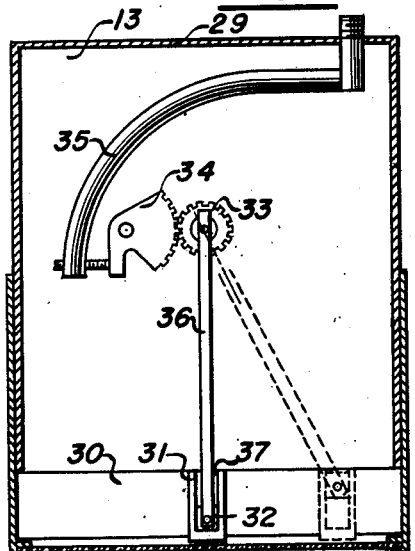
Fig.3
Fig.4
Inventor
RICHARD L. DUNCAN
By F. J. Schmitt
Attorney Patented May 26, 1953

2,639,686

UNITED STATES PATENT OFFICE 2,639,686

INDICATOR

Richard L. Duncan, United States Navy

Application March 12, 1946, Serial No. 653,924

2 Claims. (Cl. 116—129)

(Granted under Title 35, U. S. Code (1952), sec. 266)

This invention relates to gauge assemblies and indicating units therefor.

Objects of the invention are to provide improved gauge assemblies for indicating pluralities of temperatures or pressures or both in which temperatures or pressures are shown on adjacent scales for ready comparison; to provide improved gauge assemblies in which optimum values of a plurality of variables that determine proper operating conditions of engines or other mechanisms are located in aligned positions on adjacent scales; and to provide improved gauge assemblies particularly adapted for aircraft engines for indicating temperatures and pressures in such manner that operators may ascertain at a glance whether such engines are operating properly.

Other objects of the invention are to provide improved indicating units in which temperatures or pressures are indicated on substantially planar, linearly graduated scales; to provide improved thermometers of the galvanometric type; and to provide improved pressure gauges of the Bourdon type.

It is a further object of the invention to provide for carrying out the foregoing objects in a facile, economical, and efficient manner.

In accomplishing these and other objects of the present invention, I have provided improved details of structure, a preferred form of which is shown in the accompanying drawing, wherein:

Fig. 1 is a front elevational view of a gauge assembly embodying the features of the present invention;

Fig. 2 is a cross-sectional view of a temperature indicating unit employed in the assembly, taken substantially on the line 2—2 of Fig. 1;

Fig. 3 is a cross-sectional view of a pressure indicating unit employed in the assembly, taken substantially on the line 3—3 of Fig. 1; and Fig. 4 is a cross-sectional view taken substantially on the line 4—4 of Fig. 2.

Referring more in detail to the drawing:

There is shown at 10 a gauge assembly that includes a plurality of cooperating demountable indicating units, herein illustrated as being six in number and designated 11—16. The units 11—16 cooperate to indicate the conditions of operation of a mechanism, as, for example an aircraft engine. When, as here shown, the assembly is designed to indicate operating conditions of an aircraft engine, the units may conveniently indicate cylinder head temperature, oil temperature, oil pressure, fuel pressure, hydraulic pressure, and suction, and may bear indicia accordingly, as illustrated in Fig. 1. When these factors are of proper value, it may be assumed that the engine is operating properly. It is obvious, however, that cooperating or related pressures and temperatures to be indicated by the assembly may be varied as desired without departing from the invention.

In the form of the invention illustrated, the units 11 and 12 indicate temperatures and preferably are thermometers of the galvanometric type; the units 13, 14, 15, and 16, indicate pressures and preferably are pressure gauges of the Bourdon type. The units 11—16 are of substantially the same size and shape and have linearly graduated scales on corresponding faces. The units are assembled to form a bank and may be so retained by any appropriate means, as by the frame 17 illustrated surrounding the bank of units. Said frame preferably has a transparent front piece 18 (Figs. 2 and 3) through which the scales on the units may be viewed.

The scales on the various units are graduated in such manner that readings thereon in predetermined areas indicate that a mechanism is operating properly. The areas in which readings indicate proper operation are aligned on the various scales, and preferably are of a different color than the remainder of the scale. Each unit has a movable indicator element cooperable with the scale thereof and an operator may ascertain at a glance whether all of the indicator elements are within the area of the scales that indicate proper engine operation.

Figs. 2 and 4 illustrate a preferred form of galvanometric thermometer employed in the oil temperature indicating unit 12. Since any other temperature indicating units included in the assembly are preferably of similar construction, only the one is shown in detail.

The unit 12 comprises a housing 19 that carries a scale member 20 across its front face. Said scale member has a guide portion 21. An indicator element 22 is slidably mounted on the guide portion of the scale member and includes a pointer 23 (Fig. 1) cooperable with the scale to indicate temperatures and a slotted or recessed portion 24 disposed normal to said pointer. A cross-head 25 is slidably mounted in the slot or recess in said indicator element.

A permanent magnet 26 is fixedly mounted in the housing and an armature 27 rotatably mounted in the housing between the poles of said magnet. The coil of said armature is connected to a suitable thermocouple, not shown, whereby the armature is rotated in accordance with variations in a temperature, in this instance the temperature of the crankcase oil of an engine.

An arm 28 is fixed to the armature 27 and pivoted to the crosshead 25. Rotation of the armature is transmitted as linear movement to the indicator element 22 through the arm 28 and cross-head 25.

Fig. 3 illustrates a preferred form of pressure gauge employed in the oil pressure indicating unit 13. Since any other pressure indicating units included in the assembly are preferably of similar construction, only the one is shown in detail.

The unit 13 comprises a housing 29, scale member 30, indicator element 31, slotted or recessed portion 37, and cross-head 32 similar to the corresponding elements in the unit 12. A pinion 33 and a gear segment 34 meshing therewith are rotatably mounted in the housing. A Bourdon tube 35 is fixed in the housing and connected to the gear segment 34 to rotate the latter on flexure of the tube with changes of pressure therein. An arm 36 is fixed to the pinion 33 and pivoted to the cross-head 32. Rotation of the pinion is transmitted as linear movement to the indicator element through said arm and cross-head.

It is thus evident that the various units of the gauge assembly are adapted to indicate temperature or pressure, as the case may be, and thus to cooperate to indicate the conditions of performance of an engine or other mechanism in such manner that an operator may ascertain by a glance at a single instrument whether the engine is operating properly.

While I have shown but one embodiment of the present invention, it is evident that the device is subject to modification without departing from the spirit of the invention. Therefore I do not wish to be limited by the disclosure set forth, but only by the scope of the appended claims.

The invention described herein may be manufactured and used by or for the Government of the United States of America for governmental purposes without the payment of any royalties thereon or therefor.

What I claim is:

1. In an indicating unit, a housing having a frontal opening, a scale member having a frontal face with graduations thereon, a guide portion constituting a part of said scale member and extending at right angles to said face, said guide portion having an upper surface which is substantially planar and which constitutes a seat, an indicating element slidably seated on said seat and having means forming a rearwardly opening recess in the portion thereof which is located on said seat, a pointer constituting a part of said indicating element and located in parallel relationship to the frontal face of said scale member, an arm mounted at one end in said housing for pivotal movement, and a crosshead at the other end of said arm located in said recess so that upon pivotal movement of said arm said indicating element is moved by said crosshead in precise straight line motion upon the seat of said guide portion.

2. The indicating unit of claim 1 and said frontal opening having a transparent panel mounted therein, said pointer being located behind said transparent panel and in front of said scale member face.

RICHARD L. DUNCAN.

References Cited in the file of this patent

UNITED STATES PATENTS

| Number | Name | Date |
|---|---|---|
| Re. 18,283 | Johnson | Dec. 15, 1931 |
| 529,433 | Van Vleck | Nov. 20, 1894 |
| 829,368 | Clarke | Aug. 21, 1906 |
| 1,513,680 | Titterington | Oct. 28, 1924 |
| 1,571,390 | Apthorpe | Feb. 2, 1926 |
| 1,792,319 | Perkins | Feb. 10, 1931 |
| 1,878,035 | Vickery | Sept. 20, 1932 |
| 2,090,160 | Spitzglass et al. | Aug. 17, 1937 |
| 2,112,704 | Mackay | Mar. 29, 1938 |
| 2,151,976 | Koster | Mar. 28, 1939 |
| 2,237,530 | Olley | Apr. 8, 1941 |
| 2,291,610 | Crane | Aug. 4, 1942 |

FOREIGN PATENTS

| Number | Country | Date |
|---|---|---|
| 288,262 | Italy | Sept. 2, 1931 |
| 669,752 | Germany | Jan. 3, 1939 |